3,393,238
N,N,N'-TRIFLUORO-FORMAMIDINE

William C. Behnke and Harold E. Doorenbos, Midland, Mich., assignors to The Dow Chemical Company, Midland, Mich., a corporation of Delaware
No Drawing. Filed Sept. 20, 1965, Ser. No. 489,465
1 Claim. (Cl. 260—564)

This invention relates to a novel chemical compound and more particularly is concerned with a new organic fluorine and nitrogen containing compound, difluoroaminofluoroiminomethane, corresponding to the formula:

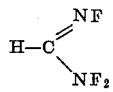

This novel chemical compound is particularly suitable for use as a high energy oxidizing agent both in liquid and solid rocket propellant systems. Additionally, it is suitable for use as an oxidizer in certain chemical applications and can be used as a constituent in explosives.

The compound is prepared by the direct low temperature fluorination of tris-(N-formylamino)methane in a stirred reactor.

Ordinarily, the process is carried out by reacting tris-(N-formylamino)methane with fluorine in the presence of an alkali metal fluoride (e.g. sodium fluoride) or alkaline earth metal fluoride (e.g. magnesium fluoride) or mixture of such inorganic fluorides. Ordinarily, on a weight basis the ratio of inorganic fluoride/tris-(N-formylamino)methane ranges from about 5 to about 50 or more.

Conveniently, difluoroaminofluoriminomethane is prepared by introducing a fluoride stream into a reactor containing an agitated mixture of tris-(N-formylamino) methane and sodium fluoride while maintaining the reaction temperature at a maximum of about 0° C. and preferably at about minus 20° C.

The resulting reaction products are removed from the reactor and collected in a cold receiver, e.g. a cold trap immersed in liquid oxygen or a fluorocarbon such as Freon 12. The difluoroaminofluoriminomethane product readily is separated from the product mixture by distillation, codistillation, chromatography or other separation procedures. Vapor phase chromatography provides an excellent means for recovering the present novel compound.

Although fluorine can be introduced directly into the reactor, desirably this reactant is employed in diluted form. A mixture of an inert gas, such as nitrogen, argon, etc. and fluorine wherein the amount of fluorine in the mixture ranges from about 20 to about 40 percent on volume basis has been found to be particularly suitable. This dilution range is not critical, however.

The ratio of fluorine and tris-(N-formylamino)methane to be employed is not critical except that for optimum product yield, fluorine in excess of that stoichiometrically required for the compound production is used. Any excess fluorine that is not reacted can be recovered from the effluent product mixture exiting from the reactor and can be recycled for subsequent reaction.

The present novel compound can be prepared in a batch type or continuous operation. Reactors and processing equipment to be employed are fabricated from those materials which are not detrimentally affected by the reactants or product and which have the requisite physical strength and desired structural characteristics as is understood by one skilled in the art. Stainless steel, nickel, nickel alloys and the like all are suitable materials of construction.

The following example describes a mehod for preparing the novel compound, difluoroaminofluoriminomethane, but is not meant to be limiting.

Example

A mixture of about 3 grams of tris-(N-formylamino)-methane and 50 grams of substantially anhydrous sodium fluoride was placed in a 250 milliliter, three-necked Monel metal flask fitted with a mechanical stirrer in its center neck. A 0.25 inch inside diameter copper tube was fitted into one of the side necks. This led to a fluorine and nitrogen source. The other side neck of the flask was fitted with a take-off tube. This take-off tube in turn was connected to a U-shaped collector, the bottom of which was placed in a Freon 12 fluorocarbon bath maintained at a temperature of about minus 120° C.

A gaseous mixture of nitrogen (73 volume percent) and fluorine (27 volume percent) at a total flow rate of about 300 cubic centimeters per minute was introduced into the reaction vessel. The reaction vessel was partially immersed in a cooling bath maintained at about minus 20° C. The gas flow into the reactor was continued for about 3 hours after which time the cooling bath was removed from around the reactor vessel and the fluorine flow stopped. As the reactor warmed, the nitrogen gas flow was continued for an additional 30 minutes.

The resulting product mixture collected in the cold U-tube receiver was recovered and separated using vapor phase chromatography techniques. The actual separation was carried out by passing the product mixture through di-2-ethylhexyl sebacate and Kel-F fluorocarbon on Chromasorb.

The novel compound difluoroaminofluoriminomethane was recovered.

This compound was characterized as follows:

(1) Boiling point: ~ minus 8° C.

(2) The infrared spectrum shows strong NF absorption in the region of 10–11.5 microns and CH absorption at 3.2 microns. Very few other bands are found in the spectrum and the C=N at 6.1 microns was weak. The spectrum is consistent with the given structure.

(3) Mass spectrometry results are in good agreement with the spectrum expected for difluoroaminofluoriminomethane. These results of this analysis are summarized in Table 1.

TABLE 1

[Mass Spectrum of $F_2NC=NF$]

| m/e | Assignment | Relative Intensity |
| --- | --- | --- |
| 13 | CH | 7.29 |
| 14 | N | 5.1 |
| 27 | HCN | 18.7 |
| 31 | CF | 6.7 |
| 33 | NF | 11.3 |
| 41 | $HCN_2$ | 4.8 |
| 46 | HC=NF | 100.0 |
| 52 | $NF_2$ | 18.6 |
| 59 | $CN_2F$ | 2.3 |
| 60 | $CHN_2F$ | 3.4 |
| 78 | $CN_2F_2$ | 1.79 |
| 79 | $CHN_2F_2$ | 1.35 |
| 98 | Parent | 0.20 |

(4) Nuclear Magnetic Resonance data also confirm the structure in that there are no aspects of the spectrum not consistent with the formula

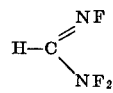

These studies showed the $F^{19}$ spectrum as two rather broad (~200 cps.) lines, one at −50.6 $\phi$ attributed to $NF_2$ and the other at −28.0 $\phi$ attributed to C=NF. The former is close to twice the area of the latter.

The H' spectrum consists of a pair of 1,2,1 triplets centered at −7.8 p.p.m. relative to TMS. Spin decoupling at the $NF_2$ frequency ($F^{19}$) reduces this pattern to a doublet of 23 cps. spacing. This is a reasonable coupling for $HC=NF$. Spin decoupling at the $C=NF$ frequency collapses the pattern to a single 1,2,1 triplet with $J=14$ cps., attributed to the $HCNF_2$ coupling.

We claim:
1. The compound difluoroaminfluoriminomethane.

References Cited

Emeleus et al.: "Advances in Inorganic Chemistry," vol. 3, pages 356–59 (1961).

CHARLES B. PARKER, *Primary Examiner.*

R. V. HINES, *Assistant Examiner.*